(12) United States Patent
Wilkinson et al.

(10) Patent No.: US 7,140,662 B1
(45) Date of Patent: Nov. 28, 2006

(54) RETRACTABLE SUNSHADE

(76) Inventors: Kari L. Wilkinson, 378 Whitfield Ave., Sarasota, FL (US) 34243; Thomas Lewis Wilkinson, 378 Whitfield Ave., Sarasota, FL (US) 34243

( * ) Notice: Subject to any disclaimer, the term of this patent is extended or adjusted under 35 U.S.C. 154(b) by 485 days.

(21) Appl. No.: 10/679,626

(22) Filed: Oct. 6, 2003

(51) Int. Cl.
*B60J 3/00* (2006.01)
(52) U.S. Cl. ................................... 296/97.4
(58) Field of Classification Search ........... 296/97.4, 296/77.1, 84.1, 83, 95.1, 97.1, 97.5, 97.7–97.9, 296/97.11
See application file for complete search history.

(56) References Cited

U.S. PATENT DOCUMENTS

| | | | | |
|---|---|---|---|---|
| 4,647,102 A | * | 3/1987 | Ebrahimzadeh | 160/84.04 |
| 4,751,115 A | * | 6/1988 | Smith et al. | 428/12 |
| 4,775,180 A | * | 10/1988 | Phillips | 160/84.04 |
| 4,886,104 A | * | 12/1989 | Eldridge, Jr. | 160/370.23 |
| 4,974,655 A | * | 12/1990 | Teachout | 160/84.04 |
| 5,004,285 A | * | 4/1991 | Bennett | 160/370.23 |
| 5,042,550 A | * | 8/1991 | Yee | 160/84.04 |
| 5,746,469 A | * | 5/1998 | Nonaka | 296/97.7 |

* cited by examiner

*Primary Examiner*—H Gutman

(57) ABSTRACT

The retractable sunshade is a motorized pulley-operated sunshade for the front windshield of a motor vehicle that operates in a similar manner to a drapery rod. This product would protect the interior of the vehicle from intense heat build-up while the vehicle is parked outside in direct sunlight and could also serve as a theft deterrent by obstructing the view of the interior of the car from would be thieves. The unit primarily consists of a reversible electric motor, a flexible opaque shade, two guide tracks, four pulleys, a control switch, and mounting hardware. The rectangular shade would be scented with a fragrance to provide a pleasant smell for the interior of the vehicle while making it more comfortable to enter after being parked in the sun.

20 Claims, 4 Drawing Sheets

RETRACTABLE SUNSHADE

BACKGROUND OF THE INVENTION

1. Field of the Invention

The present invention relates to a retractable sunshade for use in connection with the front windshield of a motor vehicle. The retractable sunshade has particular utility in connection with protecting the interior of the vehicle from intense heat build-up and the subsequent damage to interior components and belongings in the vehicle.

2. Description of the Prior Art

Automobiles that are parked in the hot sun tend to experience an intense build-up of heat that can be dangerous to individuals entering the car and can cause damage to the interior of the vehicle as well as to any belongings inside the vehicle. Car owners have turned to such solutions as placing towels over the dashboard and seats to placing sunshades in the windshield to help alleviate this problem. However, these solutions require the manual placement and removal of these items each time the car is parked and then reentered. Therefore, a motorized device that allowed the user to deploy or retract a sunshade on the vehicle's windshield while protecting the interior of a vehicle from the intense heat build-up experienced when parked in the hot sun would be extremely useful to vehicle owners.

The use of automobile sunshades is known in the prior art. For example, U.S. Pat. No. 5,344,206 to Roy J. Middleton discloses an automobile shade that consists of flexible rectangular shade with a cable inserted in a hem along the upper edge and a second cable inserted in a hem along the lower edge of the shade. The cables are connected on one end to a supply housing and on the other end to a take-up housing. An electric power source and a two way switch are employed to deploy and retract the sheet of material. However, if either of the cables were to kink and not play out or wind up smoothly, the Middleton '206 device would not operate correctly and could cause the cable to snap. Moreover, due to the location of the cables in the Middleton '206 device, a broken cable would be difficult and tedious to replace. Finally, if the shade material were to wear around the cable or if the hem were to fall out, the cables would droop, rendering the Middleton '206 device inoperable.

U.S. Pat. No. 5,947,544 to Carmel Hubeshi discloses an electromechanical sun visor for motor vehicle windows that includes a sunshade screen rolled onto a spring-loaded takeup roller and a roller housing attachable to the interior of the roof of the vehicle adjacent to the window upper side. A rotatable shaft is driven in forward and backward directions with a bidirectional electric motor connected to the car battery to retract and extend the sun shade screen. Support strips of flexible metal are incorporated into the edges of the sun shade. However, the flexible metal support strips of the Hubeshi '544 device are highly susceptible to bending and kinking, which would render the device inoperable. Furthermore, since there are no guide cables or channels for the Hubeshi '544 device, the shade might not deploy in the correct fashion for a variety of reasons, leaving portions of the car open to damage from the harmful UV rays of the sun. In addition, the lack of guidance supports for the Hubeshi '544 device prevents its usage in a horizontal application and limits its placement to the top of the windshield.

Similarly, U.S. Pat. No. Des. 369,998 to Ezra D. Eskandry discloses the ornamental design for a quilted reflective automobile window shade. However, the Eskandry '998 patent is a manual shade that would need to be placed on the interior of the windshield each time the driver parked the car and retrieved from the windshield each time he returned to the car. Additionally, the driver would need to store the Eskandry '998 device once it was removed, leaving it susceptible to bending, tearing, and other damage.

U.S. Pat. No. 5,751,488 to Craig Michael Wade discloses a motorized sunscreen for motor vehicles that has telescoping sections, a nylon cord, a reversible electric motor that extends and retracts sections of the sunscreen, and a stationary storage compartment located beneath the motor vehicle's dash. However, placement of the Wade '488 sunscreen under the dash requires substantial permanent modification to the vehicle. In addition, should the telescoping sections of the Wade '488 device become dented or bent for any reason, the entire device would be inoperable.

Likewise, U.S. Pat. No. 5,791,721 to Yung-Ching Lin discloses a motorized sunscreen for covering a vehicle window that has a base unit with spring-controlled pivot arms that are attached to a screen unit and allow the screen to be deployed through the use of an electrical motor. The sunscreen also has a solar collector and associated converter for use of the solar energy to which it is subjected. However, the Lin '721 device is complex and the solar collection panel and converter would drive up the price of the unit. Furthermore, the operation of the Lin '721 device precludes its use in a horizontal deployment. Finally, due to the size of the base unit of the Lin '721 device, major modifications to the vehicle's dash would be necessary for installation.

Lastly, U.S. Pat. No. 6,227,601 B1 to Joseph E. LaFrance discloses a motor driven sunshield that attaches to the roof of the vehicle and operates either in a manual or semi-automatic manner by deploying when the transmission is placed in PARK and the ignition is turned off and retracting when the ignition is on and the transmission is not in PARK. The drive and retraction unit are installed on the roof of the vehicle, and guide tracks are installed along the side edges of the windshield to confine the movement of the sunshade to the proper area. However, the LaFrance '601 B1 patent requires major modification to the roof of the car during installation. As such, the LaFrance '601 B1 would not be suitable for use in convertibles or jeeps having canvas style coverings. In addition, the reliance of the LaFrance '601 B1 device on the transmission mode precludes its use in vehicles with a standard transmission. Finally, the nature of the LaFrance '601 B1 device precludes its deployment in a horizontal fashion.

While the above-described devices fulfill their respective, particular objectives and requirements, the aforementioned patents do not describe a retractable sunshade that can be easily deployed to protect the interior of the car from damaging sunlight and heat while requiring a minimum amount of modification to the vehicle. The Middleton '206, Hubeshi '544, and Wade '488 devices would be rendered inoperable due to bending, kinking, or denting of the metal portions of the devices. Moreover, since the cables of the Middleton '206 are secured within hems along the edge of the shade, they would be extremely difficult to replace and any unraveling of the hem would cause the cable to droop and not operate correctly. Since there are no guide cables or channels for the Hubeshi '544 device, the shade might not deploy in the correct fashion for a variety of reasons, leaving portions of the car open to damage from the harmful UV rays of the sun. The Hubeshi '544, Lin '721, and LaFrance '601 B1 sunshades can not be configured in a horizontal deployment. Furthermore, the Wade '488, Lin '721, and LaFrance '601 B1 devices would requires major modifications to the vehicle for installation. The LaFrance '601 B1 can not be used in convertibles, jeeps with canvas coverings, or vehicles operating with a standard transmission. In addition, the Lin '721 device is complex and the solar collection panel and converter would drive up the price of the unit. Finally, the Eskandry '998 device requires the driver to manually deploy, retrieve, and store the sunshield each time it is used. Improper storage of the Eskandry '998 device could cause bending, soiling, tearing, and other damage.

Therefore, a need exists for a new and improved retractable sunshade that can be used for easy vertical or horizontal deployment across the windshield of a vehicle to protect the interior of the vehicle from damage due to heat buildup and sunlight. In this regard, the present invention substantially fulfills this need. In this respect, the retractable sunshade according to the present invention substantially departs from the conventional concepts and designs of the prior art, and in doing so provides an apparatus primarily developed for the purpose of protecting the interior of the vehicle from intense heat build-up and the subsequent damage to interior components and belongings in the vehicle.

SUMMARY OF THE INVENTION

In view of the foregoing disadvantages inherent in the known types of automobile sunshades now present in the prior art, the present invention provides an improved retractable sunshade, and overcomes the above-mentioned disadvantages and drawbacks of the prior art. As such, the general purpose of the present invention, which will be described subsequently in greater detail, is to provide a new and improved retractable sunshade and method which has all the advantages of the prior art mentioned heretofore and many novel features that result in a retractable sunshade which is not anticipated, rendered obvious, suggested, or even implied by the prior art, either alone or in any combination thereof.

To attain this, the present invention essentially comprises a reversible electric motor, a flexible shade, two guide tracks along which the shade travels similar to draperies on a rod, a control button, and mounting hardware.

There has thus been outlined, rather broadly, the more important features of the invention in order that the detailed description thereof that follows may be better understood and in order that the present contribution to the art may be better appreciated.

The invention may also include a scented fragrance incorporated into the shade for use as an air freshener in the vehicle. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved retractable sunshade that has all of the advantages of the prior art automobile sunshades and none of the disadvantages.

It is another object of the present invention to provide a new and improved retractable sunshade that may be easily and efficiently manufactured and marketed.

An even further object of the present invention is to provide a new and improved retractable sunshade that has a low cost of manufacture with regard to both materials and labor, and which accordingly is then susceptible of low prices of sale to the consuming public, thereby making such a retractable sunshade economically available to the buying public.

Still another object of the present invention is to provide a new retractable sunshade that provides in the apparatuses and methods of the prior art some of the advantages thereof, while simultaneously overcoming some of the disadvantages normally associated therewith.

Even still another object of the present invention is to provide a retractable sunshade for obstructs the entry of ultraviolet rays (UV) from the sun through the windshield of a motor vehicle. This protects the interior of the vehicle and any stored personal items from damage due to the sun's rays.

Yet another object of the present invention is to provide a retractable sunshade for decreasing the heat buildup in a motor vehicle when it is parked in the sunlight. This makes reentry into the vehicle less dangerous and more comfortable for both the driver and passengers.

Even yet another object of the present invention is to provide a retractable sunshade which can be deployed in a vertical or horizontal fashion. This allows the sunshade to be used in a wide variety of applications including cars, motor homes, trucks, boats, airplanes, buses, and for covering windows in structures such as homes, apartments, office buildings, churches, and retail establishments Still yet another object of the present invention is to provide a retractable sunshade which can be automatically operated. This saves the driver time and effort by eliminating the time consuming and cumbersome process of placing and retrieving a sunshade each time it is used.

Lastly, it is an object of the present invention to provide a new and improved retractable sunshade that is scented. This improves the aroma of the vehicle in which the sunshade is mounted, making the drive more enjoyable.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
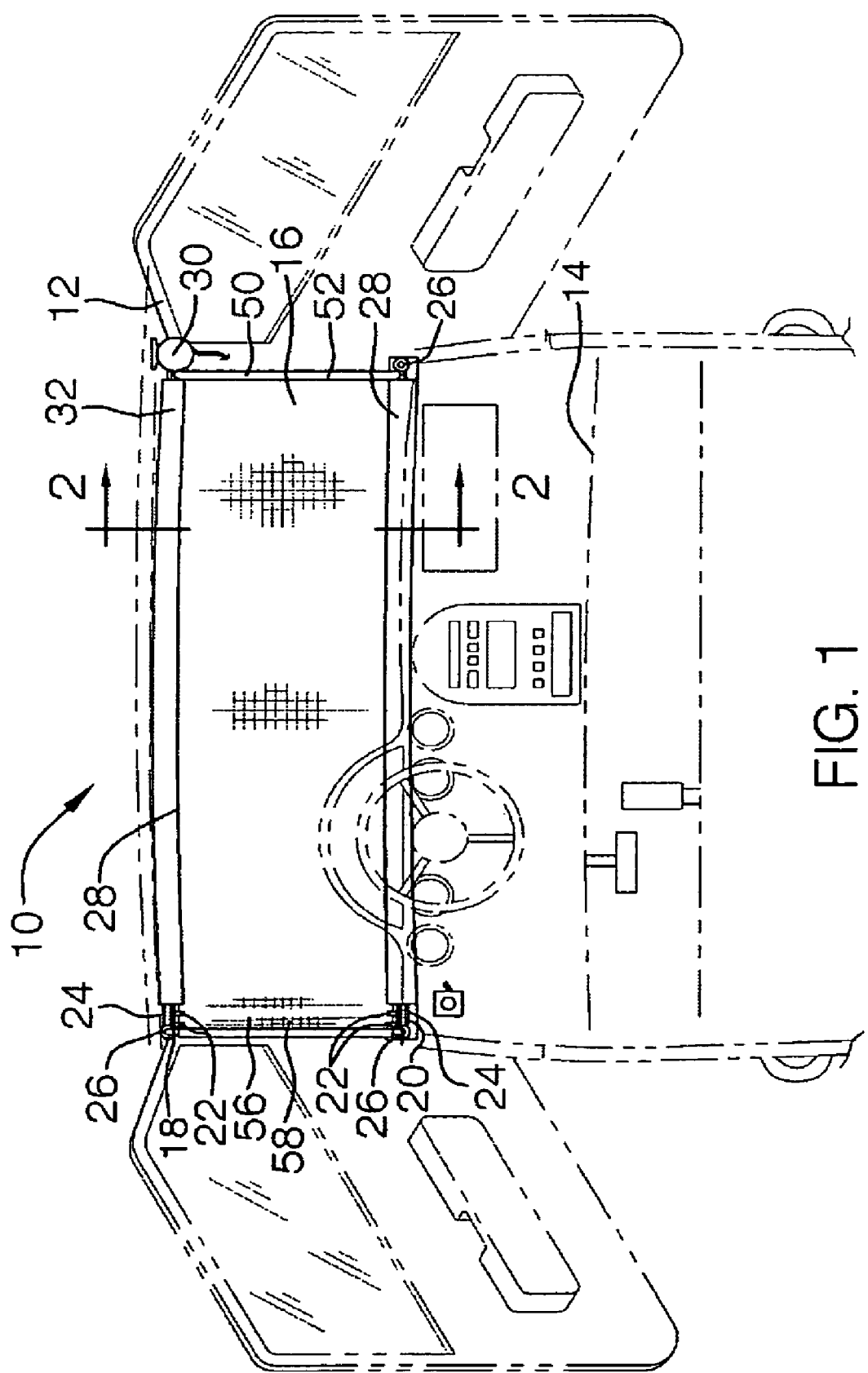
FIG. 1 is a front elevation of the preferred embodiment of the retractable sunshade constructed in accordance with the principles of the present invention.

Referring now to the drawings, and particularly to FIGS. 1–5, a preferred embodiment of the retractable sunshade of the present invention is shown and generally designated by the reference numeral 10.

In FIG. 1, a new and improved retractable sunshade 10 of the present invention for protecting the interior of the vehicle from intense heat build-up and the subsequent damage to interior components and belongings in the vehicle is illustrated and will be described. More particularly, the retractable sunshade 10 is shown horizontally deployed across the front windshield 12 of an automobile 14. The sunshade 10 consists of a flexible fabric shade 16 connected to an upper track 18 and a lower track 20 by sliding attachments 22 that operate in a manner similar to drapery slides. Note that the tracks, 18 and 20, could also be located along the right and left hand sides of the vehicle, allowing the retractable sunshade to be deployed vertically instead of a horizontally. A wire 24 is looped around two upper pulleys 26 on each end of the tracks, and a second wire 24 is similarly looped around two lower pulleys. The upper and lower tracks, 18 and 20, are protected from dirt and debris by a track cover 28. The small reversible electric motor 30 is connected at the upper right hand corner 32 of the device and controls the movement of the shade 16. When the shade 16 is deployed, the sliding attachments 22 move along the upper and lower tracks, 18 and 20, until the shade 16 is spread across the entire windshield 12. When the shade 16 is retracted, the sliding attachments 22 move toward each other along the upper and lower tracks, 18 and 20, and gather the shade 16 in a pleated manner at one side of the windshield 12. The shade 16 would be treated with a scented fragrance to provide a pleasant smell for the interior of the car.

Figure 2:
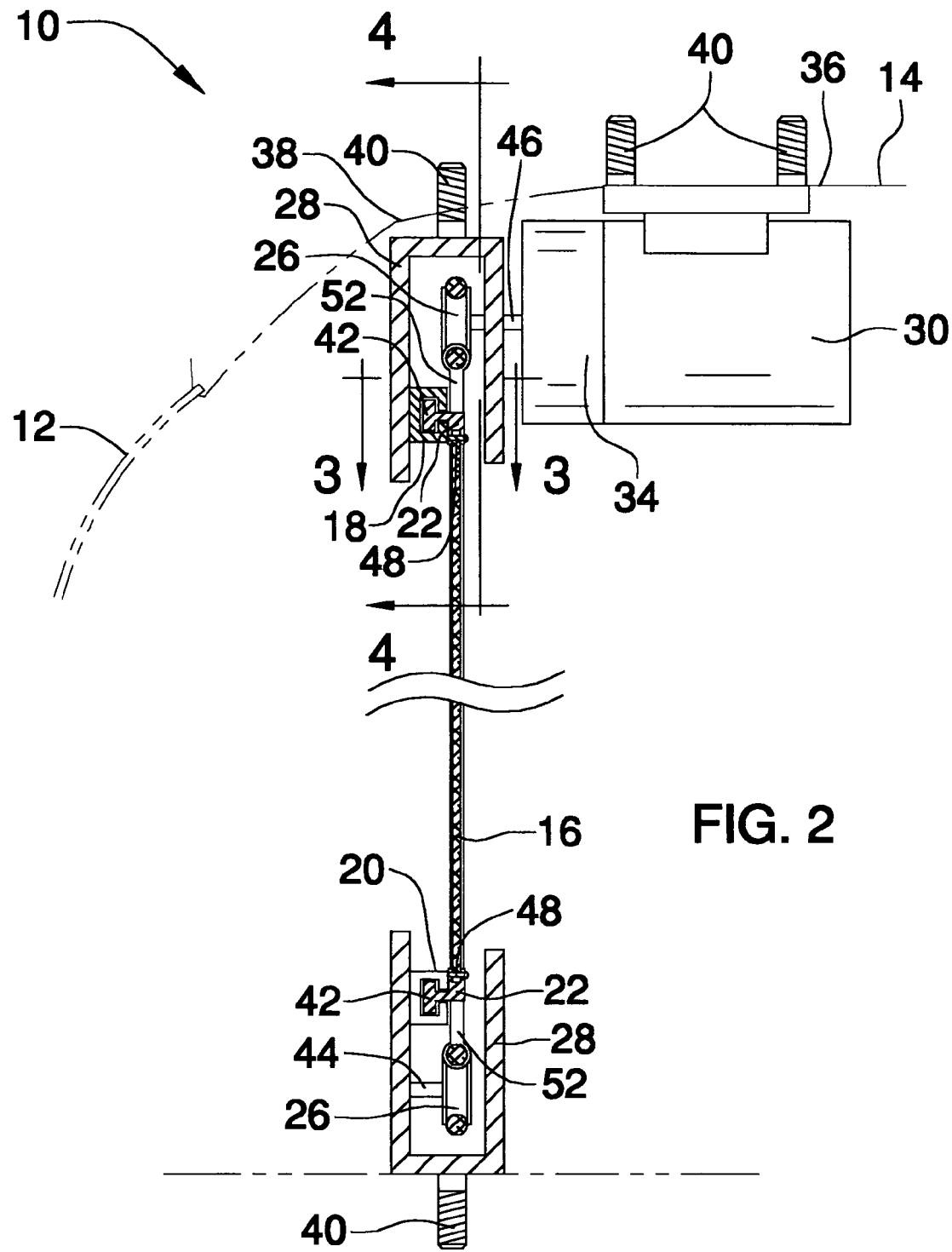
FIG. 2 is a left side cross sectional view of the retractable sunshade of the present invention.

FIG. 2 shows a left side cross sectional view of the retractable sunshade 10. This view shows the placement of the device along the interior of the automobile 14. The motor 30 and gear assembly 34 are attached to the inner ceiling 36 of the vehicle 14 near the front right hand corner. The upper track 18 and associated pulleys 26 are connected along the ceiling of the vehicle 14 at the point where the front 38 of the vehicle 14 begins to slope downward to the windshield 12. The lower track 20 and associated pulleys 26 are connected directly below the upper track 18 so that the shade 16 is perpendicular to the ceiling 36 of the vehicle 14 when deployed. Mounting screws 40 are used to secure the various parts of the retractable sunshade 10 to the vehicle 14. The upper and lower track, 18 and 20, have a reverse C-shape with T-shaped opening into which the base portion 42 of each sliding attachment 22 fits. Each of the tracks, 18 and 20, is secured inside the appropriate track cover 28, and each pulley 26 is connected by means of a pulley axle 44. The upper right hand pulley 26 is attached to the motor shaft 46 of the gear assembly 34 driven by the motor 30. The shade 16 is affixed to the clip portion 48 of each sliding attachment 22 so that the sliding attachments 22 are spaced evenly along the length of the shade 16.

Figure 3:
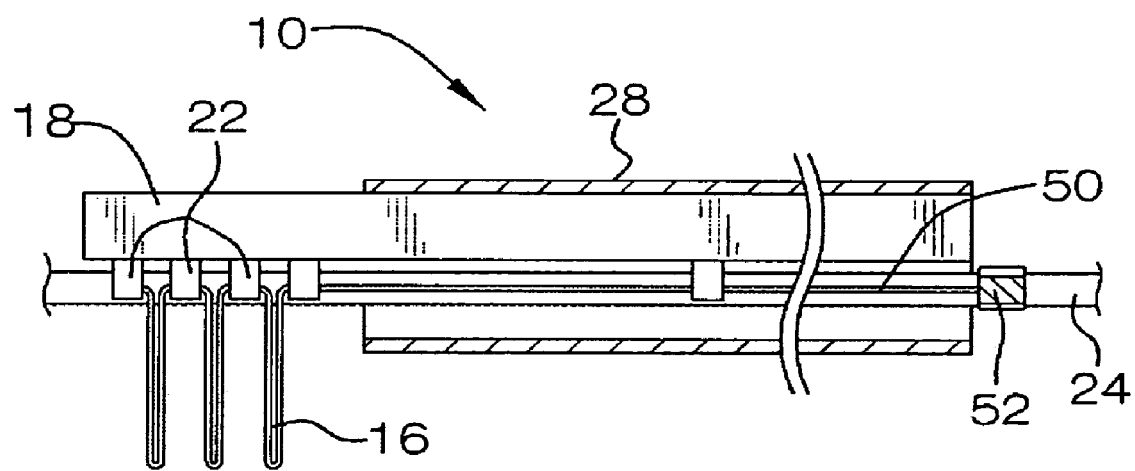
FIG. 3 is a top cross sectional view of the retractable sunshade of the present invention.

FIG. 3 is a top cross sectional view of the retractable sunshade 10. This view shows the shade 16 as it would appear when partially deployed or retracted. The leading edge 50 of the shade 16 is affixed to the upper wire 24 with a wire attachment 52 which serves to deactivate the motor 30 when the wire attachment 52 reaches the upper right hand pulley 26. The wire attachment 52 has a rounded top end through which the upper wire 24 passes, a vertical extension attached to the leading edge 50 of the shade 16, and a rounded bottom end through which the lower wire 24 passes (see also FIGS. 1,2). As the shade 16 is retracted, the sliding attachments 22 move toward the left hand side of the vehicle 14, sliding closer together and forcing the shade 16 to gather, forming pleats 54 as it exits the track covers 28. The trailing edge 56 (see FIG. 1) of the shade 16 is anchored via a shaft 58 to the upper and lower tracks, 18 and 20.

Figure 4:
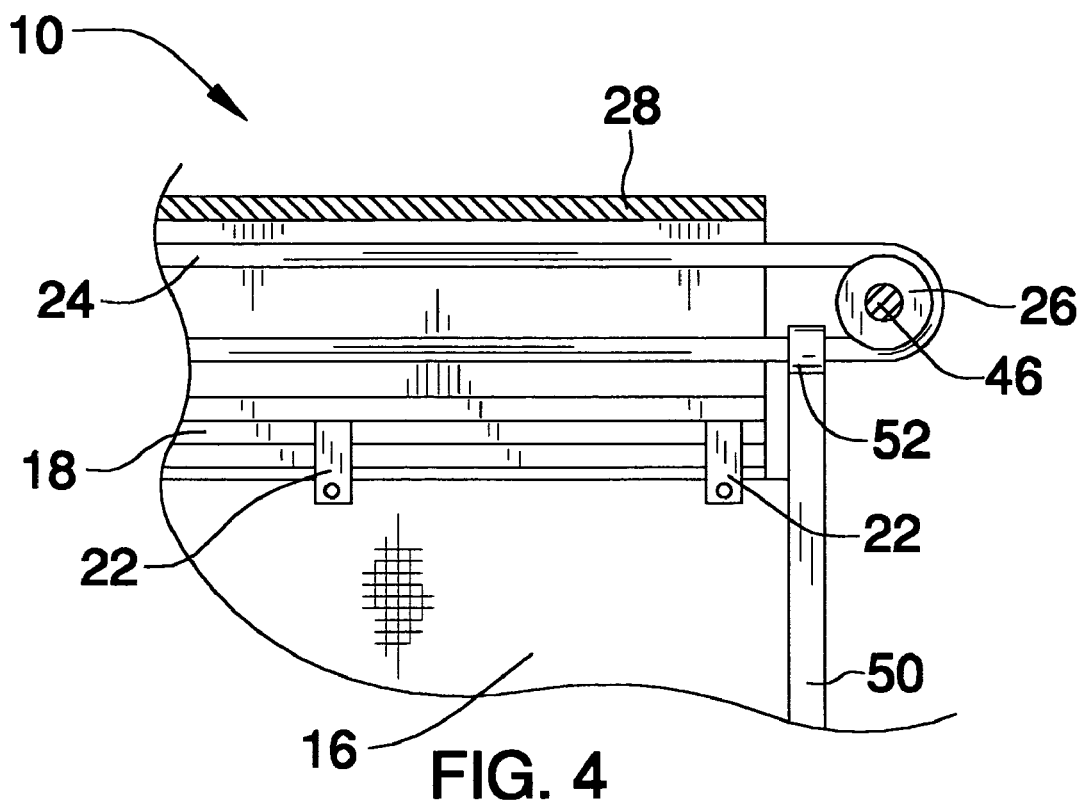
FIG. 4 is a front cross sectional view of the pulley configuration of the retractable sunshade of the present invention.

FIG. 4 is a front cross sectional view of the upper right hand corner of the retractable sunshade 10. When the wire attachment 52 signifying the leading edge 50 of the shade 16, reaches the pulley 26, the motor shaft 46 is no longer able to rotate and the motor 30 is deactivated. At this point, each of the sliding attachments 22 has reached its fully deployed position in which the shade 16 is pulled flat across the windshield 12 of the vehicle 14.

Figure 5:
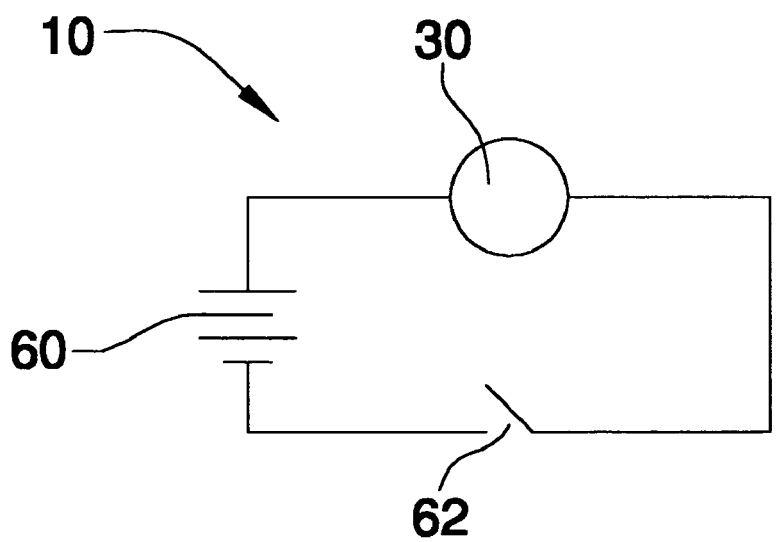
FIG. 5 is an electrical schematic of the retractable sunshade of the present invention.

FIG. 5 is an electrical schematic of the retractable sunshade 10. The electrical motor 30 is connected to the vehicle's battery 60 and is activated by a control switch 62 placed in a location easily accessible to the driver of the vehicle 14.

In use, it can now be understood that the owner of the vehicle 14 would install the retractable sunshade 10 in the vehicle. When the vehicle 14 is parked in the hot sun, the driver would simply press the control switch 62 prior to exiting the interior of the vehicle 14. The electric motor 30 would then be activated and the shade 16 would slide outward along the guide tracks, 18 and 20, for complete coverage of the inside of the windshield 12. The shade 16 would be opaque and would obstruct sunlight at the windshield 12 in the driver's absence, preventing heat buildup and protecting the dashboard and front seating area against damaging ultraviolet (UV) rays of the sun. The shade 16 would also help to obstruct the view into the front of the vehicle 14, which could serve as a security measure against theft. Upon returning to the parked vehicle, the driver would once again press the control switch 62, and the reversible motor 30 would retract the shade 16 into a compact storage state. This would expose the entire windshield 12 for full forward visibility by the driver.

Ideally, the retractable sunshade 10 would be integrated into new motor vehicle production, being offered as standard or optional equipment to new vehicle purchasers. It would also be offered in an aftermarket model for installation into existing vehicles. The product could be used in automobiles, trucks, vans, recreational vehicles, and airplanes. The product could also be integrated into the design of new production recreational boats.

While a preferred embodiment of the retractable sunshade has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any opaque flexible material such as canvas, neoprene mesh, plastic, burlap, vinyl or similar material can be used for the sunshade described. Also, the upper and lower tracks can be made of metal, heavy duty plastic, or a variety of wood. And although protecting the interior of the vehicle from intense heat build-up and the subsequent damage to interior components and belongings in the vehicle has been described, it should be appreciated that the retractable sunshade herein described is also suitable for use in covering windows in structures such as homes, apartments, office buildings, churches, and retail establishments. Furthermore, a wide variety of scents may be used to provide the pleasant smell emanating from the shade, and the shade could be offered in a wide variety of colors and patterns to increase the aesthetic appeal of the device.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A retractable sunshade comprising:
   a reversible motor capable of rotating in a first direction and a reverse direction;
   a control switch connected to said motor;
   a gear assembly connected to said motor;
   a motor shaft having a first end connected to said motor;
   a first pair of pulleys connected together by a first wire wherein said first wire is looped around said first pair of pulleys like a rubber band and connected to said motor shaft wherein one of said first pair of pulleys is connected to said second end of said motor shaft;
   a wire attachment having a circular top end with a transverse aperture, an elongated portion extending downward from said top end, and a circular bottom end with a transverse aperture and connected to said first wire of said first pair of pulleys wherein said first wire passes through said aperture in said top end;
   a flexible shade having a top edge, a bottom edge parallel to said top edge, a leading edge, and a trailing edge and connected along said leading edge to said elongated portion of said wire attachment;
   a second pair of pulleys connected together by a second wire wherein said second wire is looped around said second pair of pulleys like a rubber band and connected to said wire attachment wherein said second wire passes through said aperture in said bottom end of said wire attachment;
   a first plurality of sliding attachments having a sideways T-shaped base and a vertically extending clip section and connected on said clip section to said top edge of said shade wherein said sliding attachments are spaced equidistant along said shade;
   a first elongated block C-shaped guide track having a first end, a second end, and an interior with a sideways T-shaped opening and slideably connected to said first plurality of sliding attachments wherein said base of each of said first sliding attachments resides in said opening of said first guide track and is capable of sliding along said first guide track;
   a second plurality of sliding attachments having a sideways T-shaped base and a vertically extending clip section and connected on said clip section to said bottom edge of said shade wherein said second sliding attachments are spaced equidistant along said shade;
   a second elongated block C-shaped guide track having a first end, a second end, and an interior with a sideways T-shaped opening and slideably connected to said second plurality of sliding attachments wherein said base of each of said second sliding attachments resides in said opening of said second guide track and is capable of sliding along said second guide track;
   a first hollow rectangular track cover having a first end, a second end, a top, an open bottom, a front side perpendicular to said top, and a rear side parallel to said front side and forming a rectangular hollow interior and connected to said first guide track wherein said first guide track is wholly affixed to and parallel to said rear side of said first track cover and said first and said second ends are located near said first and said second ends of said first guide track, respectively;
   a second hollow rectangular track cover having a first end, a second end, a top, an open bottom, a front side perpendicular to said top, and a rear side parallel to said front side and forming a rectangular hollow interior and connected to said second guide track wherein said second guide track is wholly affixed to and parallel to said rear side of said second track cover and said first and said second ends are located near said first and said second ends of said second guide track, respectively;
   an elongated shaft having a first end, an elongated central portion, and a second end and connected along said central portion to said trailing edge of said shade, on said first end to said interior of said first track cover, and on said second end to said interior of said second track cover; and
   a plurality of mounting screws connected to said first track cover, said second track cover, and said motor.

2. The retractable sunshade of claim 1 wherein said shade is rectangular.

3. The retractable sunshade of claim 1 wherein said shade is scented with a fragrance for enhancing the aroma of the interior of said motor vehicle into which said retractable sunshade is mounted.

4. The retractable sunshade of claim 1 wherein said first pair of pulleys further comprises:
   a pulley axle connecting the other of said first pair of pulleys to said interior of said first track cover along said rear side near said first end.

5. The retractable sunshade of claim 1 wherein said second pair of pulleys further comprises:
   a pair of pulley axles connecting said second pair of pulleys to said interior of said second track cover along said rear side wherein one of said axles connects one of said second pair of pulleys near said first end of said second track cover and said other axle connects said other pulley of said second pair of pulleys near said second end of said second track cover.

6. The retractable sunshade of claim 1 wherein said sunshade is installed in a motor vehicle and said motor is electrically connected to the battery of said motor vehicle.

7. The retractable sunshade of claim 1 wherein said first track cover is connected horizontally to the ceiling of said motor vehicle at point just before said ceiling slopes downward to meet the windshield of said vehicle and said second track cover is connected horizontally to the dash of said vehicle directly below said point where said first track is connected wherein said second track cover is parallel to said first track cover.

8. The retractable sunshade of claim 1 wherein said first track cover is connected vertically to the forward right interior of said motor vehicle at a point just before the passenger side door and said second track cover is connected vertically to the forward left interior of said motor vehicle at a point just before the driver side door wherein said second track cover is parallel to said first track cover.

9. The retractable sunshade of claim 1 wherein said shade is comprised of an opaque material.

10. The retractable sunshade of claim 1 wherein activation of said control switch causes said motor to reverse directions from the previous said activation of said control switch.

11. The retractable sunshade of claim 10 wherein said motor turning in said first direction, causing said pulley attached to said motor shaft to turn and rotate said first wire toward said motor shaft, causing a leading edge of said shade to be pulled toward said motor shaft and subsequently causing said shade to be deployed as said sliding attachments move along said upper and said lower tracks.

12. The retractable sunshade of claim 10 wherein said motor turning in said reverse direction, causing said pulley attached to said motor shaft to turn and rotate said first wire away from said motor shaft, causing a leading edge of said shade to be pulled away from said motor shaft and subsequently causing said shade to be retracted and form pleats as each said first plurality of sliding attachments moves next to adjacent said second plurality of sliding attachments at a trailing edge of said shade.

13. A retractable sunshade comprising:
- a first pair of pulleys having a first pulley formed with a transverse aperture and a second pulley formed with a transverse aperture;
- a first wire loop connected around said first pair of said pulleys;
- a wire connector having a first end formed with a transverse aperture, an elongated shaft, and a second end formed with a transverse aperture and connected to said first wire loop wherein said first wire loop passes through said aperture in said first end of said wire connector;
- a second wire loop parallel to said first wire loop and connected to said wire connector wherein said second wire loop passes through said aperture in said second end of said wire connector;
- a second pair of pulleys having a first pulley formed with a transverse apertures and a second pulley formed with a transverse aperture and connected to said second wire loop wherein said second wire loop passes around said second pair of pulleys;
- a flexible, opaque, rectangular shade having a leading edge, a trailing edge parallel to said leading edge, a first edge perpendicular to said leading edge and joining said leading edge to said trailing edge, and a second edge parallel to said first edge and connected along said leading edge to said elongated shaft of said wire connector;
- an edge connector having a first end, an elongated shaft, and a second end, wherein said edge connector is connected along its elongated shaft to said trailing edge of said shade;
- a plurality of sliding attachments having a vertical clip extending from a horizontal T-shaped connector and connected on said clip to said shade wherein a first portion of said sliding attachments are connected to said first edge of said shade and a second portion of said sliding attachments having a like number of said sliding attachments as said first portion are connected to said second edge of said shade;
- a first track guide having a similar length as said first edge of said shade with a flat, elongated rear surface, an elongated downward hooked top surface, and an elongated upward hooked bottom surface forming a horizontal T-shaped opening and connected to said first portion of said sliding attachments wherein said T-shaped connectors reside in said T-shaped opening;
- a second track guide having a similar length as said first track guide with a flat, elongated rear surface, an elongated downward hooked top surface, and an elongated upward hooked bottom surface forming a horizontal T-shaped opening and connected to said second portion of said sliding attachments wherein said T-shaped connectors reside in said T-shaped opening;
- a first hollow rectangular guide cover having a front side, a rear side formed with a length approximately the same as that of said first track guide and parallel to said front side, and a top side perpendicular to said front side and joining said front side to said rear side, and an open bottom forming a hollow interior and connected on said interior of said rear side to said first track guide wherein said first track guide is parallel to said front and said rear sides;
- a second hollow rectangular guide cover having a front side, a rear side formed with a length approximately the same as that of said second track guide and parallel to said front side, and a bottom side perpendicular to said front side and joining said front side to said rear side, and an open top forming a hollow interior and connected on said interior of said rear side to said second track guide wherein said second track guide is parallel to said front and said rear sides;
- a motor shaft connected to said first pulley of said first pair of pulleys wherein said shaft passes through said transverse aperture of said first pulley of said first pair of pulleys;
- a gear assembly connected to said motor shaft;
- a reversible motor having a first rotational direction and a second reverse rotational direction and connected to said gear assembly;
- a control switch connected to said reversible motor;
- a first pulley axle having a first end and a second end and connected on said first end to said rear side of said first guide cover and on said second end to said first end of said edge connector wherein said first pulley axle passes through said transverse aperture of said second pulley of said first pair of pulleys;
- a second pulley axle having a first end and a second end and connected on said first end to said rear side of said second guide cover wherein said second pulley axle passes through said transverse aperture of said first pulley of said second pair of pulleys;
- a third pulley axle having a first end and a second end and connected on said first end to said rear side of said second guide cover and on said second end to said second end of said edge connector wherein said third pulley axle passes through said transverse aperture of said second pulley of said second pair of pulleys; and a plurality of mounting screws connected to said first guide cover, said second guide cover, and said motor.

14. The retractable sunshade of claim 13 wherein said shade is scented with a fragrance for enhancing the aroma of the interior of a motor vehicle into which said retractable sunshade is mounted.

15. The retractable sunshade of claim 13 wherein said sunshade is installed in a motor vehicle and said motor is electrically connected to the battery of said motor vehicle.

16. The retractable sunshade of claim 13 wherein said first guide cover is connected horizontally to the ceiling of a motor vehicle at a point just before said ceiling slopes downward to meet the windshield of said vehicle and said second guide cover is connected horizontally to the dash of said vehicle directly below said point where said first guide cover is connected wherein said second guide cover is parallel to said first guide cover.

17. The retractable sunshade of claim 13 wherein said first guide cover is connected vertically to the forward right interior of a motor vehicle at a point just before the passenger side door and said second guide cover is connected vertically to the forward left interior of said motor vehicle at a point just before the driver side door wherein said second guide cover is parallel to said first guide cover.

18. The retractable sunshade of claim 13 wherein activation of said control switch causes said motor to reverse directions from the previous said activation of said control switch.

19. The retractable sunshade of claim 18 wherein said motor turning in said first direction, causing said pulley attached to said motor shaft to turn and rotate said first wire toward said motor shaft, causes said leading edge of said shade to be pulled toward said motor shaft and subsequently causes said shade to be deployed as said sliding attachments move along said first and said second track guides.

20. The retractable sunshade of claim 18 wherein said motor turning in said reverse direction, causing said pulley attached to said motor shaft to turn and rotate said first wire away from said motor shaft, causes said leading edge of said shade to be pulled away from said motor shaft and subsequently causes said shade to be retracted and form pleats as each said sliding attachment moves next to adjacent said sliding attachments at said trailing edge of said shade.

* * * * *